3,328,135
MANUFACTURE OF CHLORINATED BORANES
Charles D'A. Hunt, 24 Park Lane Drive, Orinda, Calif. 94563; James V. Kerrigan, 517 Panoramic Way, Berkeley, Calif. 94704; Amos J. Leffler, 887 Oak St., Lafayette, Calif. 94549; and William W. Martin, Jr., 2509 Parker St., Berkeley, Calif. 94704
No Drawing. Filed Aug. 10, 1959, Ser. No. 832,437
6 Claims. (Cl. 23—361)

This application is a continuation-in-part of application Ser. No. 659,758, filed May 17, 1957, for the Manufacture of Chlorinated Boranes, now abandoned.

This invention relates to the manufacture of boranes and chlorinated boranes by the reaction of boron trichloride with hydrogen at elevated temperatures, followed by rapid quenching of the reactants.

It has long been recognized that the reaction of boron trichloride with hydrogen would be a very economical route to the preparation of chlorinated boranes, from which can be made various boranes such as diborane. However, the reaction has remained one of only theoretical interest since, heretofore, no practical means have been known for carrying out the reaction. For instance, it has been proposed to pass boron trichloride and hydrogen through an electric arc, but this has yielded relatively small quantities of chlorinated boranes and relatively large quantities of boron metal, along with varying quantities of unidentified materials. The product is a mixture of gases, solids, and liquids which is difficult to handle and separate into useful components. It has also been proposed to react boron trichloride with hydrogen at temperatures up to about 600° C., and at pressures up to several hundred atmospheres. Aside from the inconvenience and expense of operating at these high pressures, the reaction has not been an attractive one since the yields of the desired chlorinated boranes and boranes were low.

It has now been found that boron trichloride reacts with hydrogen to produce chlorinated boranes and boranes at atmospheric pressure and at a temperature of from about 600° C. to 1500° C. and preferably between 850° and 1000° C. It has further been found that the production of the desired chlorinated boranes is substantially constant over a wide range of hydrogen to boron trichloride ratios, and that by the proper selection of the ratio, the production of boron metal can be almost entirely obviated. Further, the products of the reaction are gases and liquids which can be readily handled in conventional equipment and thus do not involve the complications of solids handling. When operating under conditions whereby boron metal is produced, the metal is deposited cleanly in the reactor tube and may be readily disposed of, as is disclosed in detail hereafter.

In general, it has been found that boron trichloride will react with hydrogen to produce chlorinated boranes, such as $BHCl_2$, and boranes at the temperatures noted above and it has been found that high yields of the desired materials may be obtained provided the products are quenched rapidly. It has been further found that by proper selection of the hydrogen-to-boron trichloride ratio that the formation of boron metal can be almost entirely obviated.

In those cases wherein boron metal is deposited in the reactor, it has been found that metal can be caused to react with anhydrous hydrogen chloride at the named reaction temperatures to convert the metal to boron trichloride and chlorinated boranes. Thus, if there is some boron deposited in the reactor, it causes no difficulty, since the deposit is of clean metal and can be readily disposed of.

The reaction of the present invention can be carried out at a temperature of from 600°–1200° C., or even higher, and it has been found that good results are obtained at a temperature of between about 850° C. and 1000° C. In fact, when the temperature is reduced below about 750° C., the reaction yields very little of the desired products and when the lowermost temperature named is selected, the process becomes very uneconomical. However, small amounts of the desired product are obtained even at 600° C. and also there is some small reaction between deposited boron and HCl at this lowermost temperature. One important aspect of the invention is the rapid quench rate, and it is preferred that the quench rate be at least 500° C. per second and preferably at least 1000° C. per second, from the reaction temperature to about 500° C., a rate of about 50° C. per second, from 500° to 200° C., and at a rate of about 25° C. per second from 200° C. to room temperature. Actually, the higher the quench rate, the better the results which will be obtained, and it has been found that good results can be obtained with quench rates of about 3000° C. per second in the range from 1000° C. to about 500° C., with proportionately lower quench rates as the temperatures decrease. It is preferred to use even higher quench rates, although the equipment for securing higher quench rates becomes expensive and may offset the economies obtained at the extremely high rates. The quench rate is largely a matter of economics and lower quench rates may be feasible under some conditions. Quenching may be achieved by passing the effluent through a cooled tube, through a jet into a cooled chamber, rapidly mixing the effluent with an inert liquid or vapor such as $BCl_3$, $TiCl_4$ or the like, or by a combination of these methods.

It has been found, surprisingly enough, that the ratio of hydrogen to boron trichloride has little effect on the production of boron-hydrogen bonded compounds within rather wide limits. It has been found that the threshold of boron metal production occurs at a ratio of about one mole of hydrogen to two-and-a-half moles of boron trichloride. Higher ratios of boron trichloride to hydrogen prevent the formation of boron metal so, in those instances where it is undesirable to deposit boron metal, it is preferred to operate with a molar ratio of boron trichloride to hydrogen of at least three-to-one. The percentage of boron trichloride can be increased above this, but there is little point in increasing the molar ratio of boron trichloride to above about 5-to-1, since this merely results in the handling of greater amounts of reactants and the yields of compounds containing boron-hydrogen bonds begins to fall off at about this ratio. Therefore, when it is desired not to produce boron metal, it is preferred to operate at ratios of from one mole hydrogen to 2½ moles boron trichloride to one mole hydrogen to 5 moles of boron trichloride. Under many circumstances, it may be preferred to operate outside of these limits. The following non-limiting examples illustrate various methods of practicing the invention.

*Example 1.*—A 1" diameter quartz reactor tube was used which was maintained at a temperature of 1000° C. About 0.0086 mole per minute of boron trichloride and 0.0525 mole per minute of hydrogen were passed through the reactor with a residence time of about three seconds. As the reactants passed from the reactor, they were rapidly cooled by passing them through an air cooled tube. The cooling rate was about 3000° C. per second in the temperature range from 1000° C. to about 500° C., about 300° C. per second down to about 200° C. and about 50° C. per second down to room temperature. The effluent was then passed through a cold trap maintained at about −75° C. The condensed liquid was analyzed by both conventional chemical and infrared techniques, and shown to contain 1.5 mole percent $B_2H_6$, 1 mole percent $BHCl_2$, 1 mole percent HCl, the remainder being $BCl_3$. The uncondensed portion was analyzed by similar techniques and was found to contain 0.25 mole percent $B_2H_6$, 1 mole percent $BHCl_2$, and 1 mole percent $BCl_3$; the remainder was a mixture of hydrogen and HCl. During the course of this reaction, 0.00186 gram per minute of boron metal was deposited in the reactor.

The condensed portion was subjected to a conventional fractionation-disproportionation operation, which produced a pure $BCl_3$ liquid fraction and a fraction containing only $B_2H_6$ and HCl. Analysis of the two fractions showed that all of the $BHCl_2$ had disproportionated to $B_2H_6$ and $BCl_3$.

*Example 2.*—The process of Example 1 was repeated, but the quench rate from 500° C. down to −75° C. was conducted at the rate of about 300° C. per second. When the product was analyzed, it was found to contain only minor amounts of $B_2H_6$ or $BHCl_2$, but to contain an unidentified compound which had the same total boron-hydrogen bonding as was produced under the conditions of Example 1. The compound has not been completely identified, but it is believed to be a complex of $BH_2Cl$, such as $(BH_2Cl)_3$, which is moderately stable at 0° C., but unstable at 100° to 200° C.

*Example 3.*—The process of Example 1 was repeated except that the ratio of hydrogen to $BCl_3$ was 1-to-2 instead of 6-to-1. Analysis of the product showed approximately the same yield of boron metal.

*Example 4.*—The process of Example 1 was repeated except that the ratio of hydrogen to $BCl_3$ was 1-to-5. No boron metal was deposited and analysis of the product showed about two-thirds the yield of boron-hydrogen bonded compounds (based on $BCl_3$ input).

*Example 5.*—In the reactor of Example 1, the boron metal which had been deposited within the reactor was heated to 1000° C. and anhydrous HCl was passed through the reactor. The HCl had a reactor residence time of about 7 to 10 seconds, and the reactor exit gas was cooled initially at a rate of about 500° C. per second to about 500° C. and at a rate of about 50° per second from 500° C. to −75° C. The effluent from the reactor was condensed and, upon analysis, was found to contain the equivalent of 2 mole percent of compounds containing boron-hydrogen bonds, present as chlorinated boranes, the remainder being $BCl_3$. A material balance showed that 80% of the HCl had been converted to $BCl_3$, chlorinated boranes and hydrogen.

*Example 6.*—The apparatus was a one inch diameter quartz reactor tube furnace, of the type described in Example 1, which had been provided with a mechanical quench section, followed by a water condenser, then a −70° C. condenser, and lasting a −196° C. trap.

The temperature of the reactor was held at 700° C. and approximately 0.0845 mole per minute of $BCl_3$ and approximately 0.0422 mole per minute of $H_2$ were sent through the reactor with a residence time of three seconds. The cooling rate from 700° C. to 400° C. was about 800° C. per second, from 400° C. to room temperature about 200° C. per second.

A liquid sample at −70° C. was taken and found to contain, by I.R. analysis, three mole percent $BHCl_2$, less than one mole percent HCl, and the remainder $BCl_3$, with an "unknown" species reported only as "present."

The vapors escaping from the −70° C. condenser were passed through a −196° C. trap and a timed sample taken. I.R. analysis established that the condensed contents of this gas stream were: 94 mole percent HCl, 5 mole percent $B_2H_6$, 0.5 mole percent $BHCl_2$ and a trace of $BCl_3$.

We claim:
1. A process for the production of chlorinated boranes containing boron-hydrogen bonds comprising: heating hydrogen and boron trichloride gases to a temperature of no less than about 600° C. and no more than about 1500° C., said hydrogen and boron trichloride being the sole reactants, mixing said hydrogen and boron trichloride gases in a reaction zone at about atmospheric pressure wherein the reactants are brought to a substantially uniform operating temperature within the range of 600° C. to 1500° C., immediately quenching the gaseous reaction products and unreacted starting materials to a temperature of at least 500° C. within at least two seconds and thereafter further quenching at a rate sufficient to negate any substantial back-reaction and recovering the chlorinated boranes containing boron-hydrogen bonds so produced.

2. The process of claim 1 wherein the reactants are heated to a temperature in the range of 850° C. to 1000° C. and reacting said materials at a substantially uniform temperature within said temperature range.

3. The process of claim 1 wherein the molar ratio of boron trichloride to hydrogen is less than about 5:1.

4. The process of claim 1 wherein the molar ratio of boron trichloride to hydrogen is at least 3:1.

5. A process as stated in claim 1 wherein the product mixture at reaction temperature is quenched at the rate of at least 500° C. per second from the reaction temperature to about 500° C.; at least 50° C. per second from about 500° C. to about 200° C.; and at least 25° C. per second from 200° C. to about room temperature.

6. A process as stated in claim 2 wherein the product mixture at reaction temperature is quenched at the rate of at least 500° C. per second from the reaction temperature to about 500° C.; at least 50° C. per second from about 500° C. to about 200° C.; and at least 25° C. per second from 200° C. to about room temperature.

References Cited

UNITED STATES PATENTS

| | | | |
|---|---|---|---|
| 1,074,672 | 10/1913 | Weintraub | 23—209 |
| 2,469,879 | 5/1949 | Hurd | 23—204 |
| 2,542,916 | 2/1951 | Fetterley | 23—209 X |
| 2,768,061 | 10/1956 | Cook et al. | 23—204 X |
| 2,839,367 | 6/1958 | Stern et al. | 23—209 |
| 2,875,028 | 2/1959 | Winternitz | 23—204 X |
| 2,992,248 | 7/1961 | Pearson | 260—429 |

OTHER REFERENCES

Hodgman, "Handbook of Chemistry and Physics," 33rd edition, 1951–52, p. 1891.

Hurd, "Journal of the American Chemical Society," vol. 71, pp. 20–22 (January 1949).

Mellor, "Comprehensive Treatise on Inorganic and Theoretical Chemistry," 1924, vol. V, pp. 9, 15.

Schlesinger et al., "Journal of the American Chemical Society," vol. 53, pp. 4321–4332.

Sidgwick, "Chemical Elements and Their Compounds," 1950, vol. I, pp. 15–18.

Stern et al. (II), "Journal of the Electrochemical Society," vol. 105, pp. 676–682 (November 1958).

Weintraub, "Industrial and Engineering Chemistry," vol. 3, pp. 299–301 (1911).

OSCAR R. VERTIZ, *Primary Examiner.*

MAURICE A. BRINDISI, *Examiner.*

M. WEISSMAN, *Assistant Examiner.*